US009438337B2

(12) United States Patent
Byers

(10) Patent No.: US 9,438,337 B2
(45) Date of Patent: Sep. 6, 2016

(54) CONTROL SYSTEM FOR MULTI-BEAM FREE SPACE OPTICAL ENDPOINT

(71) Applicant: Cisco Technology Inc., San Jose, CA (US)

(72) Inventor: Charles Calvin Byers, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 14/292,888

(22) Filed: May 31, 2014

(65) Prior Publication Data

US 2015/0349881 A1    Dec. 3, 2015

(51) Int. Cl.
| | | |
|---|---|---|
| *H04B 10/00* | (2013.01) | |
| *H04B 10/11* | (2013.01) | |
| *H04B 10/079* | (2013.01) | |
| *H04B 10/112* | (2013.01) | |
| *H04B 10/114* | (2013.01) | |

(52) U.S. Cl.
CPC ......... *H04B 10/11* (2013.01); *H04B 10/07955* (2013.01); *H04B 10/1123* (2013.01); *H04B 10/1143* (2013.01)

(58) Field of Classification Search
USPC ................................................ 398/131, 127
See application file for complete search history.

(56) References Cited

U.S. PATENT DOCUMENTS

| | | | | |
|---|---|---|---|---|
| 6,522,437 | B2 * | 2/2003 | Presley .............. | H04B 10/1125 398/128 |
| 8,208,818 | B2 * | 6/2012 | Sasai ............................ | 398/185 |
| 8,348,522 | B2 * | 1/2013 | Kuznia .................... | G02B 6/43 385/147 |
| 2001/0043381 | A1 * | 11/2001 | Green ................ | H04B 10/1123 398/126 |
| 2002/0109884 | A1 | 8/2002 | Presley et al. | |
| 2002/0181055 | A1 * | 12/2002 | Christiansen et al. ........ | 359/159 |
| 2004/0091269 | A1 * | 5/2004 | Green ................ | H04B 10/1125 398/130 |
| 2005/0044211 | A1 * | 2/2005 | Adhikari ...................... | 709/224 |
| 2009/0202254 | A1 * | 8/2009 | Majumdar ......... | H04B 10/1123 398/140 |
| 2013/0236183 | A1 * | 9/2013 | Chao .................... | H04B 10/116 398/101 |
| 2013/0315604 | A1 * | 11/2013 | LoPresti ............ | H04B 10/1123 398/116 |
| 2015/0156568 | A1 * | 6/2015 | Byers ................. | H04B 10/1125 398/57 |
| 2015/0215041 | A1 * | 7/2015 | Pechner ............. | H04B 10/1123 398/130 |

OTHER PUBLICATIONS

Yuksel et al., Free-space-optical mobile ad hoc networks: Auto-configrable building blocks, Apr. 2007, Springer Science + Business Mdeica, pp. 295-312.*
Nakhkoob et al., Multi-Transceiver Optical Wilreless Spherical Structures for MANETs, 2009, IEEE, pp. 1612-1622.*
Yuksel et al., Free-space-optical mobile ad hoc networks: Auto-configurable building blocks, 2007, Springer Science + Business Mdeia, LLC, pp. 311-312.*
Nakhkoob et al., Multi-Transceiver Optical Wireless Spherical Structures for MANETs, 2009, IEEE, pp. 1612-1622.*
International Search Report and Written Opinion for PCT/US2015/024901 mailed Jul. 27, 2015.

* cited by examiner

*Primary Examiner* — Ken N Vanderpuye
*Assistant Examiner* — Jai Lee

(57) ABSTRACT

Free space optics (FSO) is a wireless technology that utilizes optical frequencies. Previously available FSO transceivers are restricted to point-to-point links because of the high directivity of laser light used to transmit data. By contrast, various implementations disclosed herein include a multi-beam FSO apparatus that is less reliant on point-to-point links, and includes a lens assembly and a planar array of optical communication devices. The lens assembly includes at least one surface shaped to direct ingress light received substantially within a first angular range towards a focal plane, and to direct egress light away from the focal plane into the first angular range. The planar array includes a plurality of optical communication devices arranged in association with the focal plane of the lens assembly, wherein each of the plurality of optical communication devices characterizes at least one of a plurality of optical communication link endpoints.

20 Claims, 9 Drawing Sheets

CONTROL SYSTEM FOR MULTI-BEAM FREE SPACE OPTICAL ENDPOINT

TECHNICAL FIELD

The present disclosure relates to data communications, and in particular, to systems, methods and apparatuses enabling a multi-beam free space optical endpoint.

BACKGROUND

The ongoing development of data networks includes improving wireless access to useable bandwidth. Wireless access, for example, enables mobile communication and more concentrated management of operator-maintained physical network infrastructure assets. Wireless data networks that use radio frequency (RF) technologies (e.g., cellular networks, WiFi) are often bandwidth limited within defined bands of spectrum. In an area with a high concentration of client devices relative to a bandwidth allocation managed by an access point (e.g., a cellular base station), each client device can be restricted to a few kilobits (kb) of data throughput. Additionally, the frequency spectrum bands designated for cellular data traffic are typically licensed to operators that pass on the licensing costs to subscribers.

Free space optics (FSO) is a wireless technology that utilizes optical frequencies. A FSO data link can provide orders of magnitude more bandwidth than a RF data link. However, previously available FSO transceivers are restricted to point-to-point links because of the high directivity of the light beams used to transmit data. In turn, previously available FSO data links include a discrete FSO transceiver at each end of a point-to-point link. In order to increase the number of data links a single FSO transceiver can service scanning systems have been proposed that include mechanically changing the transceiver sighting and using active beam deflectors to track moving clients, and/or systematically connect to a sequence of several clients in their view. However, previously available FSO transceivers are large and rely on precise sighting, and in turn, the scanning systems are costly, delicate, slow, cumbersome, mechanically complex, and power hungry. Alternatively, previously available multi-beam FSO endpoint assemblies include a curved-surface that is tessellated with an array of discrete FSO transceivers. Each FSO transceiver covers a solid angle of space emanating from a respective point on the curved-surface. Such an assembly is large, expensive, difficult to assemble and repair, and difficult to align so that individual beams are transmitted or received from the intended points on the curved-surface. In view of the aforementioned issues, the scalability of FSO networks using previously available multi-beam FSO transceivers is quite limited.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
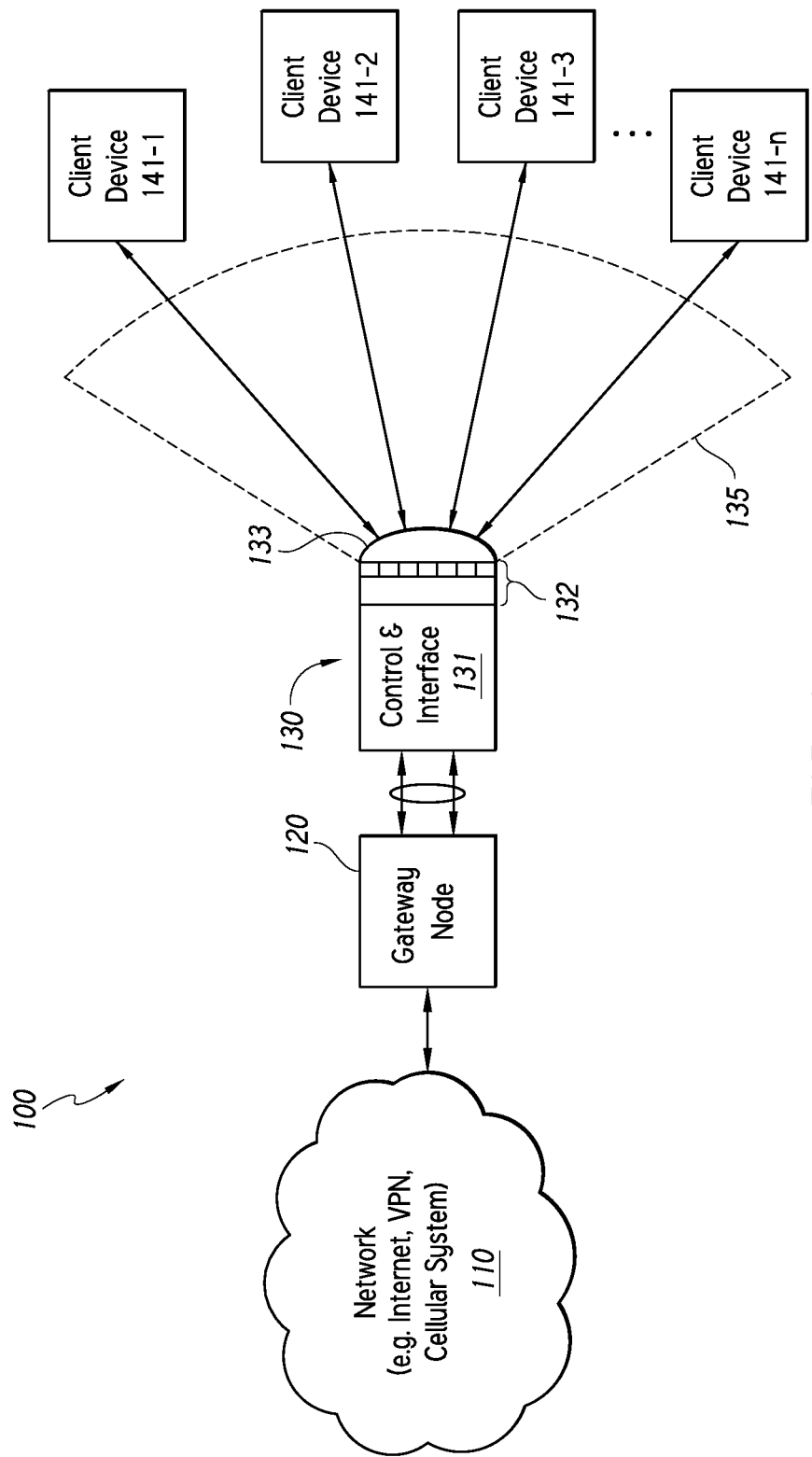
FIG. 1 is a block diagram of a free space optical (FSO) data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.
Overview Previously available free space optical (FSO) transceivers are restricted to point-to-point links because of the high directivity of the light beams used to transmit data. By contrast, various implementations disclosed herein include control systems, devices and methods for a multi-beam FSO device that is simultaneously operable to provide one or more point-to-point data channels. In some implementations, a multi-beam FSO device includes optical communication devices configured to share a pool of dynamically assignable channel control modules, where an active data channel is supported by a respective pairing of an optical communication device and a channel control module. In some implementations, a control method includes monitoring optical signal power received by one or more of the optical communication devices in order to detect an incoming optical data signal received using at least one of the optical communication devices; assessing a detected incoming optical data signal in order to determine whether or not the incoming optical data signal corresponds to an active data channel; and adjusting one or more pairings between the optical communication devices and the channel control modules in response to the assessment of the received optical signal. In some implementations, when the received optical data signal corresponds to an established and active data channel, adjusting one or more includes transferring primary support of the active data channel to a new pairing between the optical communication devices and the channel control modules. In some implementations, when the received optical data signal does not correspond to an established and active data channel, adjusting one or more includes establishing a new pairing between the optical communication devices.

FIG. 1 is a block diagram of a FSO data communication environment 100 in accordance with some implementations. While pertinent features are illustrated, those of ordinary skilled in the art will appreciate from the present disclosure that various other features have not been illustrated for the sake of brevity and so as not to obscure more pertinent aspects of the example implementations disclosed herein. To that end, as a non-limiting example, the FSO data communication environment 100 includes a plurality of client devices 141-1, 141-2, 141-3, . . . 141-n, a multi-beam FSO endpoint 130, a gateway node 120 and a network 110.

The gateway node 120 couples the multi-beam FSO endpoint 130 to the network 110. For the sake of brevity and convenience FIG. 1 illustrates a single gateway node in combination with a single multi-beam FSO endpoint. Those of ordinary skill in the art will appreciate that in various implementations any arbitrary number of gateway nodes are each communicatively coupled to any arbitrary number of multi-beam FSO endpoints in order to establish at least a portion of a FSO data communication environment. Moreover, in various implementations, the gateway node 120 provides the multi-beam FSO endpoint 130 with access to any one of a number of communication networks including a RF wireless network, an optical cable network, a wireline network, a local area network (LAN) and/or wide area network (WAN), such as an intranet, an extranet, a virtual private network, or the Internet. Additionally and/or alternatively, in some implementations, multiple gateway nodes are provided for a multi-beam FSO endpoint, and each gateway node provides the multi-beam FSO endpoint with access to a respective communication network and/or service. In some implementations, the gateway node 120 is integrated with the multi-beam FSO endpoint 130. In some implementations, the gateway node 120 includes one or more computing and/or routing devices, which are distributed or collocated depending on operating and resource allocation factors pertinent to a particular deployment.

As shown in FIG. 1, the multi-beam FSO endpoint 130 includes a control and interface module 131, a planar array of optical communication devices 132 and a lens assembly 133. As described in greater detail below with reference to FIGS. 2 and 3, the multi-beam FSO endpoint 130 provides a number of optical beam data channels within an angular range 135. Each of the optical beam data channels enables free space optical communication with one or more of the plurality of client devices 141-1, 141-2, 141-3, . . . 141-n. Each of the optical beam data channels has a respective angular portion on the lens assembly 133 from which it is directed to or from the planar array of optical communication devices 132. More specifically, the lens assembly 133 includes at least one surface shaped to direct ingress light received substantially within the angular range 135 towards the planar array of optical communication devices 132, and to direct egress light away from the planar array of optical communication devices 132 into the first angular range 135 towards one or more of the client devices 141-1, 141-2, 141-3, . . . 141-n. As such, the multi-beam FSO endpoint 130 couples the plurality of client devices 141-1, 141-2, 141-3, . . . 141-n to the network 110 through the gateway node 120. Again for the sake of brevity and convenience FIG. 1 illustrates a single multi-beam FSO endpoint in combination with a group of client devices. And again, those of ordinary skill in the art will appreciate that in various implementations any arbitrary number of multi-beam FSO endpoints are each communicatively coupled to any arbitrary number of client devices in order to establish at least a portion of a FSO data communication environment.

Each of the plurality of client devices 141-1, 141-2, 141-3, . . . 141-n generally includes any suitable computer device, such as a computer, a laptop computer, a tablet device, a netbook, an internet kiosk, a personal digital assistant, a mobile phone, a smart phone, a gaming device, a computer server, or any other computing device. In some implementations, each client device 141-1, 141-2, 141-3, . . . 141-n includes one or more processors, one or more types of memory, a display and/or other user interface components such as a keyboard, a touch screen display, a mouse, a track-pad, a digital camera and/or any number of supplemental devices to add functionality.

The network 110 is any LAN and/or WAN, such as an intranet, an extranet, a virtual private network, or the Internet. In some implementations, the network 110 provides communication capability between any one of the client devices 141-1, 141-2, 141-3, . . . 141-n and one or more third party content servers and/or service servers (not shown). In some implementations, the network 110 provides communication capability between any one of the client devices 141-1, 141-2, 141-3, . . . 141-n and one or more private content servers, storage devices, gateways and/or service servers (not shown). In some implementations, the network 110 uses HyperText Transport Protocol (HTTP) to transport information using the Transmission Control Protocol/Internet Protocol (TCP/IP). The HTTP permits client devices to access various resources available via the network 110. However, implementations are not limited to the use of any particular protocol. The term "resource" as used throughout this specification refers to any piece of information or service that is accessible via a Uniform Resource Locator (URL) and includes, for example, a web page, a document, an email message, an Instant Messaging (IM) message, a Short Message Service (SMS) message, a transcribed voice message, a database, an image, a video stream, a cloud transaction, and a computational object.

In some implementations, a FSO data communication environment includes a subset or superset of the elements illustrated in FIG. 1. So although FIG. 1 shows the FSO data communication environment 100 as a number of discrete elements, FIG. 1 is intended to serve as more of a functional description of the various features which may be present in the FSO data communication environment 100 than as a structural schematic of the various implementations. For example, some elements shown separately could be combined and some elements could be further divided into sub-elements or parallel elements. Additionally, some separate elements in FIG. 1 could be implemented by a single server or module and some single elements could be implemented by one or more servers or modules. The actual number of servers in the FSO data communication environment 100 and how features are allocated among the servers will vary from one implementation to another, and may depend in part on the amount of traffic that the system must handle during peak usage periods as well as during average usage periods. For example, in some implementations, the gateway node 120 is implemented using a plurality of servers if the FSO data communication environment 100 manages a large volume of data traffic associated with a large number of client devices.

Figure 2:
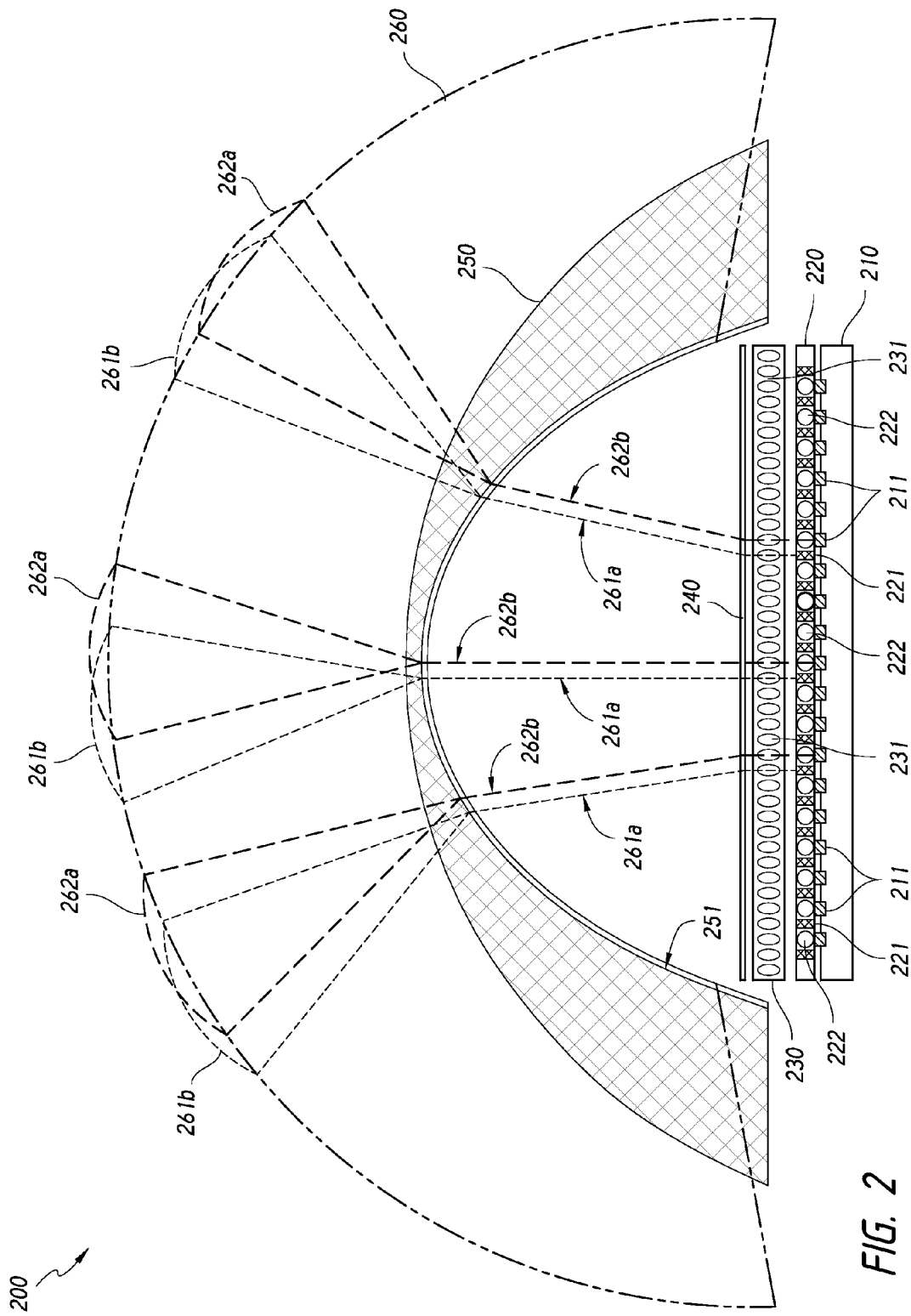
FIG. 2 is a cross section of a multi-beam FSO device in accordance with some implementations.

FIG. 2 is a cross section of a multi-beam FSO apparatus 200 in accordance with some implementations, which is similar to and adapted from the multi-beam FSO endpoint described above with reference to FIG. 1. While pertinent features are illustrated, those of ordinary skill in the art will appreciate from the present disclosure that various other features have not been illustrated for the sake of brevity and so as not to obscure more pertinent aspects of the implementations disclosed herein. To that end, as a non-limiting example, the multi-beam FSO apparatus 200 includes a lens assembly 250, an optical band-pass filter 240, a planar optics module 230, a first substrate 220 and a second substrate 210.

In some implementations, the planar optics module 230 is arranged between the lens assembly 250 and the plurality of light transmission devices 221, so that the planar optics are configured to provide at least one of egress light beam geometry shaping and beam correction. As shown in FIG. 1, in some implementations, the optical band-pass filter 240 and the planar optics module 230 are arranged between the lens assembly 250 and the first substrate 220 so that planar optics module 230 is adjacent to the first substrate 220. However, in some implementations, the optical band-pass filter is adjacent to the first substrate 220. Additionally, as shown in FIG. 1, the first substrate 220 is arranged between the lens assembly 250 and the second substrate 210. The combination of the optical band-pass filter 240, the planar optics module 230, the first substrate 220 and the second substrate 210 are arranged substantially on the focal plane of the lens assembly 250.

The first substrate 220 includes an arrangement including a plurality of light transmission devices 221 manufactured on the first substrate 220 and a plurality of perforations 222. The plurality of perforations 222, in part, define a web of substrate material that mechanically supports and connects the plurality of light transmission devices 221 associated with the first substrate 220. In some implementations, the first substrate 220 is divided into two or more segments that are individually bonded over the second substrate 210, which may improve yield and/or assembly of the multi-beam FSO apparatus 200. The second substrate 210 includes a plurality of photo-detectors 211 that are correspondingly arranged below the plurality of perforations 222. In operation, beams of ingress light from the lens assembly 250 passes through the perforations 222 to the photo-detectors 211. That is, in some implementations, the first substrate 220 is perforated to include perforations to permit a plurality of beams of ingress light to pass through the perforations to the plurality of photo-detectors 211 on the second substrate 210. Moreover, in some implementations, the first substrate 220 includes a material system suitable for optical emitter manufacturing (e.g., laser device manufacturing). In some implementations, each of the plurality of photo-detectors 211 is controllable to receive modulated ingress light including reception data from a corresponding optical communication link. In some implementations, the number of light transmission devices substantially matches the number of photo-detectors. In some implementations, there are more or fewer photo-detectors than light transmission devices.

In some implementations, each of the plurality of light transmission devices 221 is controllable to modulate a respective beam of egress light to include transmission data onto a corresponding optical communication link occupying a specific portion of the first angular range. To that end, in some implementations, some of the plurality of light transmission devices 221 include one or more bond pads (not shown). In some implementations, the first substrate 220 is suitable for III-V semiconductor laser manufacturing. In some implementations, the first substrate 220 is suitable to manufacture a light emitting device using at least one of silicon carbide and carbon nanotubes. In some implementations, some of the plurality of light transmission devices 221 include one of a laser and a light emitting diode (LED). In some implementations, some of the plurality of light transmission devices 221 each include a vertical cavity surface emitting laser (VCSEL). In some implementations, VCSELs are produced using a different manufacturing process and/or different materials from the plurality of photo-detectors 211 on the second substrate 210.

The lens assembly 250 includes at least one surface shaped to direct ingress light received substantially within a first angular range 260 towards the focal plane of the lens assembly 250; and, to direct egress light away from the focal plane into the first angular range 260. In some implementations, the lens assembly 250 includes a filter coating 251. In some implementations, the filter coating 251 is at least one of wavelength sensitive and anti-reflective. In some implementations, the filter coating 251 is configured to at least one of reduce the amount of egress light reflected back to the focal plane, substantially reject ambient light and condition ingress light directed to the plurality of photo-detectors. In some implementations, a filter is characterized by at least one of being configured to effect beam forming, being wavelength sensitive, being anti-reflective, including a quarter-wave plate, and a coating on the at least one surface of the lens assembly. Moreover, while FIG. 1 shows the lens assembly 250 as a single element, in some implementations, the lens assembly includes multiple lens elements and/or multiple lens element groups.

In some implementations, the first angular range 260 comprises a range between 10 and 200 degrees spanning at least one dimension. In some implementations, the lens assembly 250 includes a fish-eye optical lens element. Some fish-eye optical lens elements provide a field of view that extends beyond 200 degrees. In some implementations, a fish-eye optical lens element is used to transmit and receive optical beams in directions extending throughout a hemisphere, and direct the optical beams to and from the focal plane.

In some implementations, the planar optics module 230 is provided to perform beam geometry shaping and correction. To that end, in some implementations, planar optics module 230 includes a plurality of micro-lenses 231. Each of the plurality of micro-lenses 231 is arranged to intercept and condition light traveling between the lens assembly 250 and one of the plurality of photo-detectors 211 and/or one of the plurality of light transmission devices 22. In some implementations, the plurality of micro-lenses 231 includes at least one of Fresnel lenslets, micro-machined lenses, molded lenses and holographic optics. In some implementations, the optical band-pass filter 240 is provided to reduce superfluous and ambient wavelengths from the surrounding environment in order to reduce susceptibility to solar overloading, ambient light levels and/or deliberate jamming In some implementations, at least some of the plurality of photo-detectors 211 and the plurality of light transmission devices 221 comprise a planar array including a plurality of optical communication devices arranged in association with the focal plane of the lens assembly 250. As described in greater detail below, each of the plurality of optical communication devices characterizes at least one of a plurality of optical communication link endpoints. Each respective portion of the first angular range 260 and the corresponding respective area on the focal plane characterize at least a portion of a respective optical communication link associated with at least one of the plurality of optical communication link endpoints. As such, in some implementations, the beam channels are arranged in concentric rings between the center and periphery of the first and second substrates 220, 210 so that beams overlap and tessellate the hemisphere defined by the first angular range 260.

For example, each light transmission device 221 provides a beam 261a, which is slighting spread by the lens assemble 250 to produce a divergent transmission beam 261b that is splayed into a respective portion of the first angular range 260. In other words, the lens assembly 250 (an optionally the planar optics module 230) directs a beam of egress light away from the at least one of the plurality of optical communication devices into the corresponding respective portion of the first angular range 260. As noted above, the light beam transmitted by each light transmission device 221 can be modulated to include transmission data for a respective optical beam data channel. Reciprocally, the lens assembly 250 focuses an ingress light received within portions 262a of the first angular range 260 to produce respective beams 262b. Each of the respective beams 262b is directed to a corresponding one of the plurality of photo-detectors 211 on the second substrate 210. In other words, the lens assembly 250 directs a beam of ingress light received within a respective portion of the first angular range to a corresponding respective area on the focal plane that is associated with at least one of the plurality of optical communication devices.

In some implementations the transmitted and received beams deliberately diverge by approximately 1.5 times the angular spacing between the centers of the beams (e.g., about 15 degrees in some implementations). This produces overlap in the far field, insuring that the first angular range 260 of the multi-beam FSO apparatus 200 is covered by at least one receive and one transmit beam in some implementations. Moreover, the corresponding transmit and receive beams associated with a given channel are not precisely coincident because of the offset between each photo-detector and an adjacent light transmission device that characterizes the channel. In turn, this creates a slight misalignment between transmit and receive beam positions in the far field for a given channel. In some implementations, the plainer optics module 230 is configured to mitigate some of this misalignment.

Figure 3:
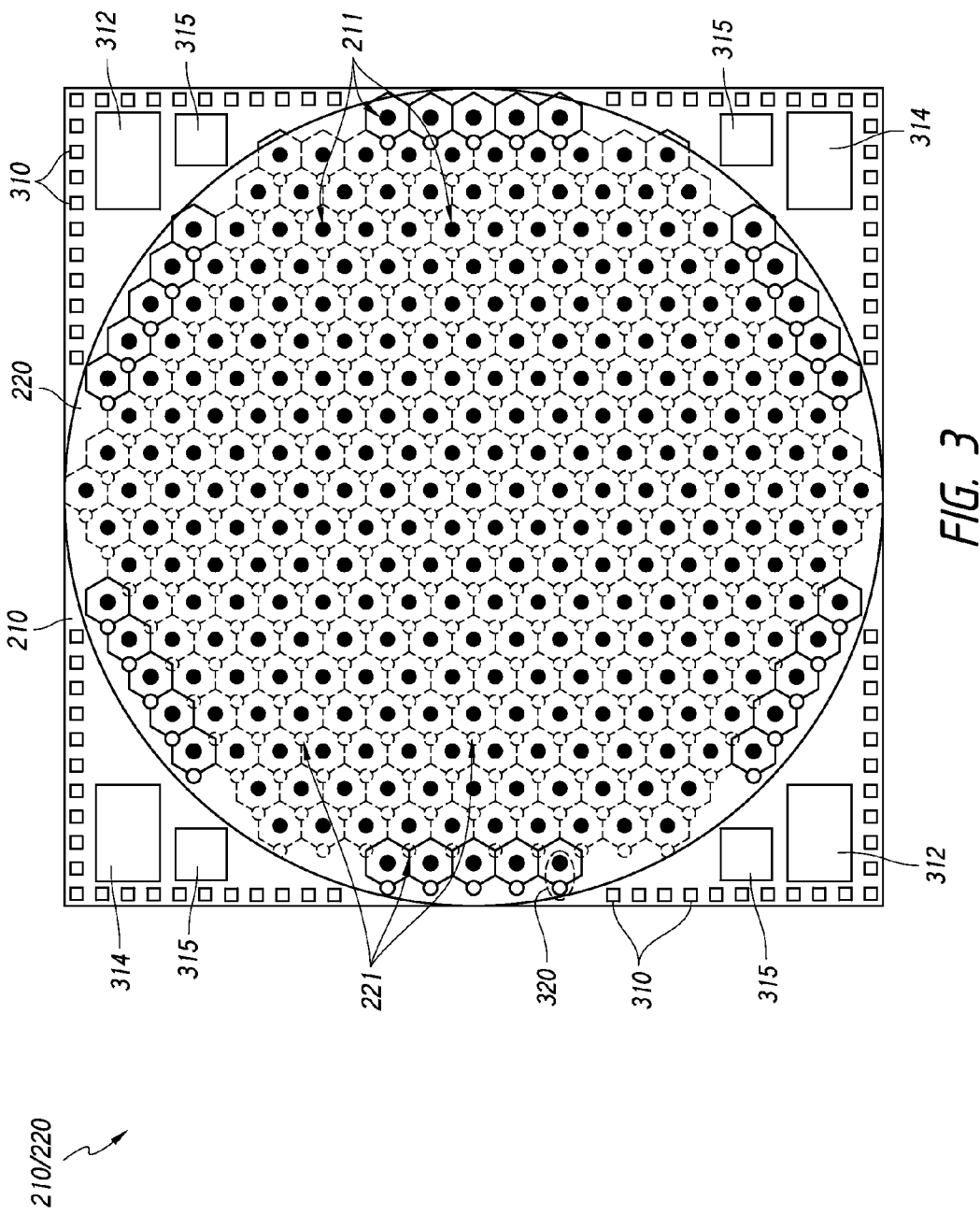
FIG. 3 is a plan view of a planar array of optical communication devices included in a multi-beam FSO device in accordance with some implementations.

FIG. 3 is a plan view of the planar array of optical communication devices included on the first and second substrates 220, 210 of FIG. 2. Accordingly, elements common to each include common reference numbers, and only aspects that cannot be seen in FIG. 2 are described with reference to FIG. 3 for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, FIG. 3 shows that the plurality of light transmission devices 221 and the plurality of photo-detectors 211 are arranged as a plurality of device groups 320. Each of the plurality of device groups includes at least one of each of the plurality of light transmission devices 221 and the plurality of photo-detectors 211. More specifically, FIG. 3 shows approximately 300 device groups in one specific implementation. The number of device groups was, at least in part, a result of the hexagonal tessellation pattern used to arrange the plurality of light transmission devices 221 and the plurality of photo-detectors 211. The hexagonal tessellation pattern is merely one of many possible arrangements that is employed in various implementations. Those of ordinary skill in the art will appreciate that other tessellation patterns (e.g., grid, concentric ring, and fractal patterns) are used in various other implementations.

Additionally, FIG. 3 shows a number of functional communication modules integrated on the second substrate 210, including memory modules 315, processing and/or logic modules 314 and interface modules 312. The second substrate 210 also includes a number of connection pads 310 that facilitate electrical connections to and from devices and/or modules on the second substrate 210. In some implementations, the first substrate 220 includes connection pads (not shown) on the surface of the proximate to the second substrate 210 in order facilitate electrical connections to and from devices and/or modules on the second substrate 210. In some implementations, the substrate 210 includes at least a portion of a control module and at least a portion of the plurality of optical communication devices.

In operation, for a given implementation, a multi-beam FSO device is configured to support a large number of simultaneously active bidirectional beam channels, each capable of carrying an independent +Gb/s data stream. As described above with reference to FIG. 2, these beam channels fan out across the volume of space served by a transceiver, and connect with far-end transceivers representing the opposite ends of the connections. For example, in some implementations, a multi-beam FSO is able to support hundreds of beam channels (e.g., 300 in some implementations, which provides approximately 10 degree angular separation between adjacent beams). However, at a given instant in typical operation of the multi-beam FSO device, it is likely that only some of the optical communication devices (i.e., light transmission devices and/or photo-detectors) are used to support active data channels (i.e., supporting a data flow). In other words, in typical operation a multi-beam FSO device may be utilized to provide fewer active data channels than could be supported by the total number of optical communication devices. Nevertheless, because of the potentially high bandwidth that can be supported on each active channel, each active channel can demand and utilize significant per-channel protocol processing, buffering, and packet switching resources to maintain a connection through a protocol stack. It is desirable to reduce the impact of resources not currently in use on the power, size, and cost of a transceiver. The remaining inactive optical communication devices, not supporting active data channels are not utilizing the complex protocol processing, but are occasionally polled to determine if a new connection needs them to be activated. As the far end transceivers move about in the volume served by a central transceiver, they move out of the angular range of one transceiver beam, and into the angular range of an adjacent beam. In order to handle such transitions, as described below various implementations provide a hand-off process to insure connections for active data channels are not interrupted.

The logic demanded to perform protocol termination and manage the link overhead for hundreds of potentially active data channels concurrently is very complex, and may not fit on a reasonably sized chip with reasonable power dissipation and cost. Thus, in some implementations, it is desirable for a number of optical communication devices to share a smaller number of active protocol engines (i.e., channel control modules). Various implementations disclosed herein enable such sharing, and provide management of hand-off between adjacent channels and acquisition of remote clients as transceivers move through the angular range services by a multi-beam FSO device.

Figure 4:
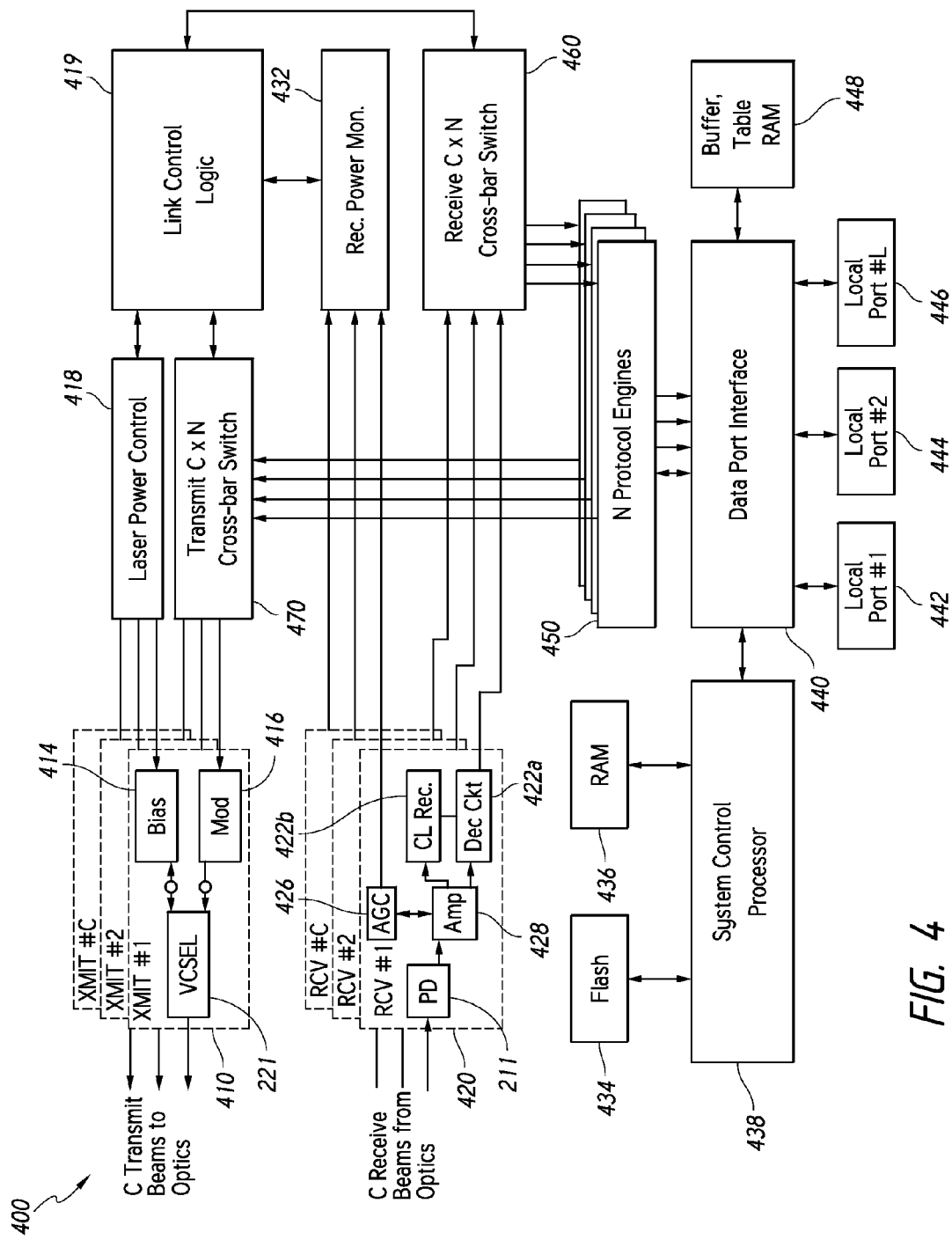
FIG. 4 is a block diagram of a configuration of communication electronics included in a multi-beam FSO device in accordance with some implementations.

FIG. 4 is a block diagram of an example configuration of communication electronics 400 associated with a multi-beam FSO device according to some implementations. Again, while pertinent features are illustrated, those of ordinary skill in the art will appreciate from the present disclosure that various other features have not been illustrated for the sake of brevity and so as not to obscure more pertinent aspects of the example implementations disclosed herein. In some implementations, the communication electronics 400 includes a plurality of channel control module that are shared by the plurality of optical communication devices, such that an active data channel is supported by a respective pairing of an optical communication device and a channel control module. In some implementations, each control module configured to manage and provide an external interface for at least one of the plurality of optical communication link endpoints, and includes at least one of a processor, digital logic, programmable firmware, and an allocation of memory. In some implementations, each control module is configured to provide at least one of protocol processing, modulation, demodulation, data buffering, power control, routing, switching, clock recovery, amplification, decoding, and error control. In some implementations, at least a portion of each control module and at least a portion of the plurality of optical communication devices are provided on a first substrate.

More specifically, as a non-limiting example, the communication electronics 400 includes a plurality of transmitters 410 (e.g., C transmitters), a plurality of receivers 420 (e.g., C receivers), a transmitter power control module 418, link control logic 419, a received power monitor module 432, a transmit C×N cross-bar switch 470, a receive C×N cross-bar switch 460, N protocol engines 450, a flash memory module 434, a RAM memory module 436, a system control processor 438, a data port interface 440, a buffer table 448, and local ports 442, 444 and 446. The transmitter power control module 418 is coupled between the plurality of transmitters 410 and the link control logic 419. The received power monitor module 432 is coupled between the plurality of receivers 420 and the link control logic 419. The plurality of transmitters 410 (i.e., optical communication devices) is coupled to the N protocol engines 450 (i.e., channel control modules) through the transmit C×N cross-bar switch 470. Similarly, the plurality of receivers 420 (i.e., optical communication devices) is coupled to the N protocol engines 450 through the receive C×N cross-bar switch 460. The cross-bar switches 460 and 470 serve to select which subset of the C optical channels are connected to the N protocol engines 450. The N protocol engines 450 communicate packet traffic to the data port interface 440. The data port interface 440 is, in turn, coupled to the system control processor 438, buffer table 448 and the local ports 442, 444 and 446. The system control processor 438 is coupled to the flash memory module 434 and the RAM memory module 436. In some implementations, the system control processor 438 includes a fog computing module. Fog computing as implemented in some embodiments by system control processor 438, flash memory 434, and RAM memory 436 provides local computational, networking and storage resources to operate the higher level functions of communications electronics 400. For example, these functions include configuration, management, monitoring, security, buffering, caching, alarming, reporting, and the performance of operations specific to this system, such as handoff, new endpoint discovery, and multi-transceiver network operation (described in greater detail below). In fog computing, functions that are often implemented in cloud-based systems are moved toward the edge or endpoints of a network to facilitate improvements in latency, performance, security, or reliability.

Each transmitter 410 includes a respective light transmission device 221 (e.g., a VCSEL, a LED, etc.), a bias module 414 and a modulator 416. The bias module 414 operates to set the quiescent conditions and operating current for the respective light transmission device 221. The modulator 416 operates to receive data from the data port interface 440 and control the respective light transmission device 221 so that the data stream is modulated onto a transmitted beam of light. The transmitter power control module 418 operates to control the transmit powers from each of the light transmission devices 221 in response to a control signal from the link control logic 419 and system control processor 438.

Each receiver 420 includes a respective photo-detector 211, an automatic gain control (AGC) module 426, and amplifier 428, a clock recovery module 422b and a demodulator and decoding module 422a. The AGC module 426 senses and provides a received power indicator from the respective photo-detector 211 to the receive power monitor 423 and link control logic 419. The amplifier 428 is provided to amplify, adapt impedances, and set the noise floor of the received signal from the respective photo-detector 211. The clock recovery circuit 422b is provided to acquire bit timing and enable synchronization of the received data signal so that the received data signal can be demodulated and decoded by the demodulator and decoding module 422a. The respective demodulated and decoded signal is then passed to the data port interface 440, which routes one or more demodulated and decoded signals to the appropriate one or more of the local ports 442, 444 and 446.

In operation, the system control processor 438 coordinates the operation of the communication electronics 400. In some implementations, the system control processor 438 is configured to manage and provide an external interface for the plurality of optical communication link endpoints, and includes at least one of a processor, digital logic, programmable firmware, and an allocation of memory. For example, in some implementations, the system control processor 438 functions include determining which links are active based on one or more indicators provided by the received power monitor 432. Additionally and/or alternatively, in some implementations, the system control processor 438 operates to coordinate laser power control setting via block 418 to enable one or more transmissions channels. Additionally and/or alternatively, in some implementations, the system control processor 438 operates to direct data traffic in the data port interface 440 between the local ports 442, 444, 446 and the transmitter 410 and receivers 420.

In some implementations, the receive power monitor module 432 is configured to receive C power monitor signals from the respective receive channel AGC circuits 426. In turn, the receive power monitor module 432 generates a data structure of the optical power being received by each photo-detector 211, which is used to determine which photo-detectors are receiving digital data. As described below with reference to the flowchart of FIG. 6, when two or more adjacent photo-detector 211 are receiving data (which is often the same optical beam being received on overlapping optical paths), power readings are compared to determine which photo-detector 211 is receiving the stronger signal. The clock/data signals from the receivers 420 connect to one dimension of the receive cross-bar switch 460 that selects a subset of receivers 420 for further processing by at least some of the N protocol engines 450.

In some implementations, the laser power control module 418 includes a data structure that the system writes, and produces command signals for the laser bias circuits 414 in order to individually set their output power. In some implementations, when the command is set to 0, the corresponding VCSEL 221 is configured to not to produce an optical output, saving power and avoiding producing superfluous transmission beams. The transmit cross-bar switch 470 accepts data outputs from the active N protocol engines 450, and directs the data outputs to the modulator blocks of the active set of the transmitters 410.

In some implementations, the N protocol engines 450 are configured to operate in parallel in order to manage the synchronization, framing, and low level protocols for up to N (i.e., ≤N) active data channels simultaneously. The N protocol engines 450 receive raw clock and bidirectional data streams, and process the respective protocol stacks to produce up to N Ethernet streams. In various implementations, the N protocol engines 450 include many of the functions of MAC and PHY blocks of an Ethernet switch chip, and also include additional protocol support suitable for a free space optical communication environment. For example, in some implementations, specialized protocol support includes synchronization, forward error correction processing in both directions, clock jitter suppression, management of data disruptions across link hand-off events, control message processing, and processing beacon signals to enable link acquisition. Once the N protocol engines 450 are finished processing the up to N active channel packet streams, the streams are provided to the data port interface 440. In some implementations, the data port interface 440 includes packet switching and/or routing functionality that selectively directs packets through the one or more of the local ports 442, 444 and 446.

In various implementations there is a tradeoff to be made when selecting a value for N relative to the value of C. On the one hand, it is desirable for a multi-bean FSO device to include a sufficient number of protocol engines to ensure that a protocol engine is available from an idle and/or underutilized pool in order to satisfy new demand for active data channels in various deployment scenarios. However, depending on the data throughput the protocol engines are configured to support, in some implementations, the protocol engines draw significant amounts of power, and occupy appreciable silicon area. Thus, on the other hand, it is also desirable to limit power consumption, complexity, physical size, and cost by limiting the number of protocol engines, N, to a value less than the number of optical communication devices, C, for a particular implementation. Those of ordinary skill in the art will appreciate from the present disclosure that this tradeoff is often implementation specific.

In some implementations, the link control logic 419 is configured for selecting and enabling an active, ≤N, subset of the C transmitter and receiver pairings (i.e., C device groups), and directing the cross-bar switches 460, 470 to connect them to the protocol engines 450. As described below with reference to FIG. 6, the link control logic 419 is involved in a hand-off method, where a moving transceiver causes the receive and transmit beams to move from one of the C device groups to an adjacent device group. The link control logic 419 is also configured to monitor the received power measurements, and determines when an idle photo-detector 211 that is adjacent to an active photo-detector 211 is receiving substantial power relative to the power received by the active photo-detector 211. In some implementations, the angular range emanating from a multi-beam FSO is tessellated with hexagonal areas, so that each beam channel (corresponding to one or more photo-detectors) has up to six adjacent channels that can be monitored in this way. Once the received power of an adjacent photo-detector 211 breaches a threshold, the link control logic 419 determines whether a hand-off to the adjacent device group warranted. If so, the adjacent receiver 420 (of the adjacent device group) optical communication device is enabled along with a corresponding transmitter 410, as described in greater detail with reference to FIG. 6 below. Further, the incoming data flow is signaled to pause, the cross-bar switches 460, 470 are reconfigured to connect the appropriate protocol engine 450 to the newly active receive and transmit channel devices. Once framing is established, the originally utilized transmit and receive channels are deactivated. In some implementations, during the transitory events where a remote endpoint may be between the angular ranges of two adjacent beams, the multicast capability of the transmit cross-bar switch 470 is utilized to send the same output packets on two or more adjacent channels. Buffers included in the protocol engines 450 are used to ensure that packets are not lost or reordered during a hand-off process. A detailed flowchart representation of an implementation of a hand-off method is provided in FIG. 6.

In some implementations, a hand-off method is configured to manage situations where two remote client transceivers have small angular separation from the perspective of a multi-beam FSO device. For example, this situation arises when one active client device passes behind another one. As a hand-off method generally includes detecting received optical power at two or more adjacent photo-detectors 211, in some implementations a method utilizes a correlation process to determine if both photo-detectors are receiving the same data stream. If optical signals received by two or more adjacent photo-detectors 211 are correlated, the far-end transceiver is determined to be located in the region of overlap between adjacent angular spaces extending from the two or more adjacent photo-detectors 211, and so hand-off may be appropriate. However, if optical signals received by two or more adjacent photo-detectors 211 is not correlated, it is determined that the two or more adjacent photo-detectors 211 are receiving different data streams from at least two independent far-end transceivers with a close angular separation. In turn, as described with reference to FIGS. 7 and 8, in some implementations, a link acquisition method includes provisioning a protocol engine for each receiver 420 receiving an independent data stream. Additionally and/or alternatively, in some implementations a multi-user per beam media access control option is invoked, in which multiple data flows are multiplexed on the same optical channel (e.g., using time multiplexing).

In some implementations, the link control logic 419 is also configured to detect new transceivers that may have just been switched on or come into range of a multi-bean FSO device. To that end, as described below with reference to FIGS. 7 and 8, the link control logic 419 periodically monitors all received signals and power monitors to determine if an acquisition beacon signal is being received by an otherwise inactive receiver 420. In some implementations, the acquisition beacon signal is a pattern of relatively high power light pulses that the link control logic can recognize without a significant amount of computational complexity or signal processing. If an acquisition beacon signal is received on an idle channel, the link control logic 419 attempts to connect the receiving receiver 420 and a companion transmitter 410 (i.e., a device group) to an idle one of the protocol engines 450 via cross-bar switches 460 and 470. Additionally and/or alternatively, in some implementations, in the reverse direction, the link control logic 419 is configured to sequentially transmit the acquisition beacon signal using each of one or more idle transmitter 410, and determine whether an acknowledgement is received from a far-end transceiver. To that end, in some implementations, the protocol engines 450 are configured to have an acquisition and synchronization mode of operations that is used to establish new active data channels. In some implementations, the acquisition process is performed on one or more of the C device groups at a rate of at least tens of Hz, to ensure that new transceivers can be acquired (or temporarily obscured transceivers can be reacquired) relatively quickly.

As noted above, in some implementations, the data port interface 440 includes packet switching and/or routing functionality. To that end, in some implementations, the data port interface 440 includes a packet switching and routing module. In some implementations, the packet switching and routing module includes a fast path implemented in silicon, and a slower path implemented in software on the adjacent control CPU 438. The packet switching and routing module also includes packet interfaces to the N protocol engines 450, as well as to the one or more local ports 442, 444 and 446. In some implementations, a single local port is provided because traffic through the multi-bean FSO device is routed through single interface to a single host CPU, vehicle processor, or network connection. In some implementations, multiple local ports are provisioned and operate in parallel. In turn, the local ports of multiple multi-beam FSO devices can be configured in a daisy-chain or X-Y mesh, where the traffic from one multi-beam FSO device, is routed through other multi-beam FSO devices in the network—which, in some deployments, reduces the total number of backbone connections to run a complete FSO installation. Additionally, multiple local ports enable load balancing, network resilience, or segregation of traffic across multiple physical networks. In some implementations, the local ports are configured to support higher bandwidth than the aggregate of the per-beam data rates in order to provide some bandwidth advantage, and accommodate the large aggregate bandwidth in dozens or hundreds of simultaneously active FSO beams.

In some implementations, the data port interface 440 is accompanied by support blocks. For example, some implementations include a RAM that buffers packets, holds routing tables, and collects traffic statistics (e.g., buffer, table RAM 448). In some implementations, the system control processor 438 uses Fog computing techniques in order to implement the slow path of routing algorithms, manage local computation used to enable a FSO network, coordinate the link control logic, maintain network data structures, and insure QoS and security for a number of endpoints. The system control node has both flash and RAM storage for algorithms, caches, tables, and high level data structures.

Moreover, in some implementations, it is not necessary to maintain a 1:1 mapping between beams on one transceiver device group and beams on a far-field transceiver. In some implementations, the N protocol engines 450 and the data port interface 440 are configured to multiplex transmissions from two or more client devices onto the respective transmit and receive beams of one transceiver device group. In other words, two or more client devices share a single device group that is paired with a corresponding one of the N protocol engines 450. In some implementations, multi-user shared media access control is employed on each active channel, permitting multiple end users to share the bandwidth available on each individual beam from a multi-beam FSO device. In complimentary fashion, each client endpoint in the footprint of a beam would use an access control protocol to determine which packets on the shared downstream connection to accept, and when to transmit its upstream packets. In some implementations, a central access point includes at least a pair of these hemispherical transceivers mounted back-to-back under the central location (e.g. under a scoreboard in an arena) that is visible by client devices.

Figure 5:
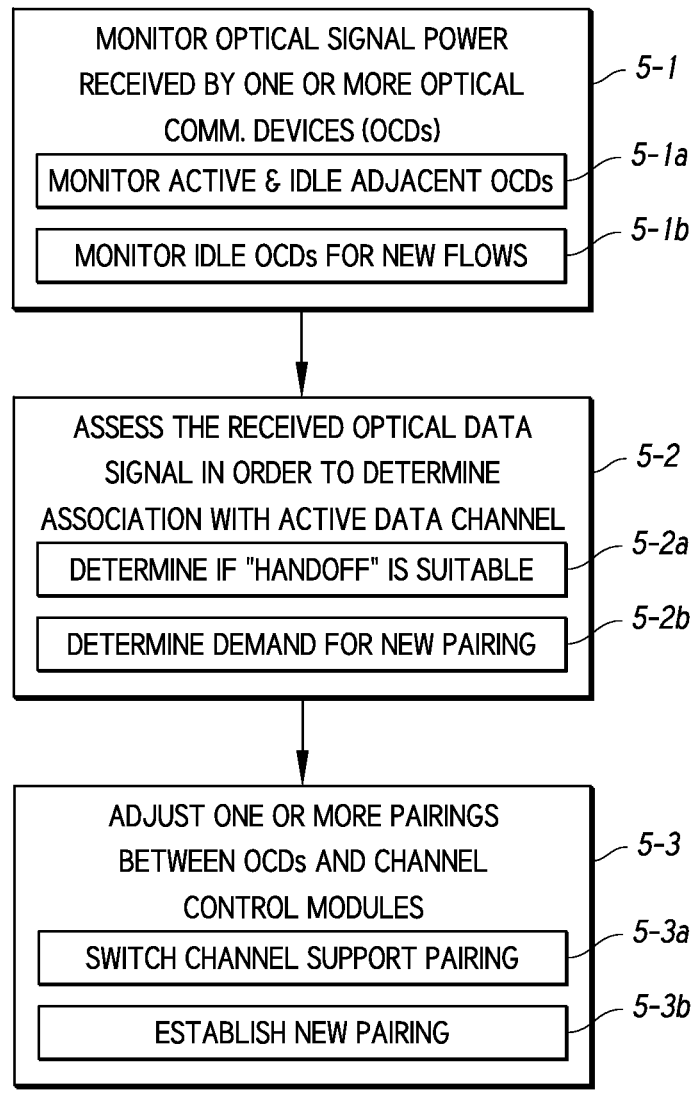
FIG. 5 is a flowchart representation of a method of managing multi-beam FSO device components in order to support data channels according to some implementations.

FIG. 5 is a flowchart representation of a method of managing multi-beam FSO device components in order to support data channels according to some implementations. In some implementations, the method is performed by a control system (e.g., the communication electronics 400 of FIG. 4) associated with a multi-beam FSO device (e.g., the multi-beam FSO device 200 of FIG. 2) including optical communication devices and channel control modules, wherein an active data channel is supported by a respective pairing of an optical communication device and a channel control module. Briefly, the method 500 includes monitoring received optical signal power in order to detect an optical data signal, assessing a detected optical data signal, and, adjusting a pairing between optical communication devices and channel control modules in response to the assessment.

To that end, as represented by block 5-1, the method 500 includes monitoring optical signal power received by one or more of the optical communication devices (e.g., device groups) in order to detect an incoming optical data signal received using at least one of the optical communication devices. For example, with reference to FIG. 4, as described above, the receive power monitor module 432 generates a data structure of the optical power being received by each photo-detector 211, which is used to determine which photo-detectors are receiving digital data. In some implementations, as represented by block 5-1a, monitoring includes monitoring optical signal power received by a first one of the optical communication devices primarily supporting a first active data channel in combination with a first one of the channel control modules; and monitoring optical signal power received by a second one of the optical communication devices, the second one of the optical communication devices being proximate to the first one of the optical communication devices. In some implementations, as represented by block 5-1b, monitoring includes determining whether or not an acquisition beacon signal is being received from a far-end transceiver or an acknowledgment is received in response to the transmission of the acquisition beacon signal from this transceiver, and/or monitoring a first one of the optical communication devices that are not currently supporting respective active data channels.

As represented by block 5-2, in some implementations, the method 500 includes, assessing a detected incoming optical data signal in order to determine whether or not the incoming optical data signal corresponds to an active data channel. For example, with reference to FIG. 4, as described above, the link control logic 419 is also configured to monitor the received power measurements, and determines determine whether or not the incoming optical data signal corresponds to an active data channel supported by an established pairing between an optical communication device (e.g., a device group) and a channel control module (e.g., protocol engine). In some implementations, as represented by block 5-2a, monitoring includes determining whether the optical signal power received by a second one of the optical communication devices satisfies a criterion relative to the optical signal power received by the first one of the optical communication devices in order to determine whether a hand-off to the second one of the optical communication devices is suitable. In some implementations, as represented by block 5-2b, assessing includes assessing a detected incoming signal in order to determine whether or not an acquisition beacon signal is being received and/or an acknowledgement to a previously transmitted acquisition beacon signal is being received by the first one of the optical communication devices.

As represented by block 5-3, in some implementations, the method 500 includes adjusting one or more pairings between the optical communication devices and the channel control modules in response to the assessment of the received optical signal. For example, with reference to FIG. 4, as described above, the link control logic 419 is configured to manage paring between the optical communication devices and the channel control modules, using the cross-bar switches 460 and 470, in order to effect hand-off and/or link acquisition. In some implementations, as represented by block 5-3a, adjusting one or more pairings includes transferring primary support of the first active data channel to a combination of a second one of the optical communication devices and the first one of the channel control modules, in response to a change in the received optical signal power. In some implementations, as represented by block 5-3b, adjusting one or more pairings includes establishing a new pairing between the first one of the optical communication devices and a first one of the channel control modules that are not currently supporting respective active data channels, the new pairing supportive of a new active data channel, or deleting existing parings that are no longer in use, and returning the channel control resources to a free pool for subsequent reuse.

Figure 6:
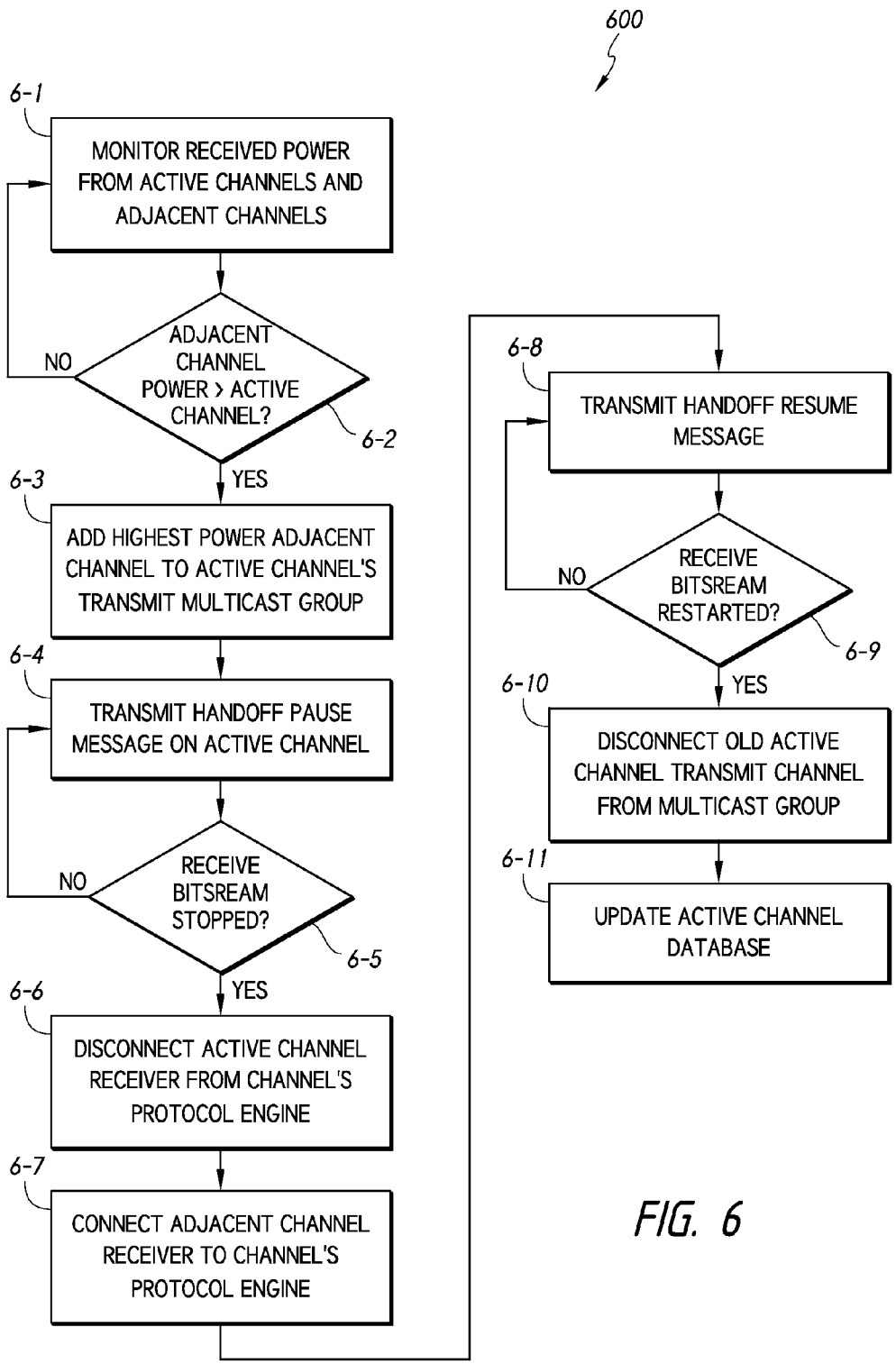
FIG. 6 is a flowchart representation of a method of transferring support of a data channel between multi-beam FSO device components according to some implementations.

FIG. 6 is a flowchart representation of a method of transferring support of a data channel between multi-beam FSO device components (i.e., a hand-off method) according to some implementations. Briefly, the method 600 includes transferring primary support of the first active data channel to a combination of a second one of the optical communication devices and the first one of the channel control modules in response to a change in the received optical signal power.

To that end, as represented by block 6-1, the method 600 includes monitoring received power from optical communication devices that are currently supporting an active data channel and adjacent optical communication devices. For example, with reference to FIG. 4, as described above, link control logic 419 is also configured to monitor the received power measurements from at least one photo-detector 211 that is adjacent to a photo-detector 211 currently supporting an active data channel. In some implementations, the angular range emanating from a multi-beam FSO is tessellated with hexagonal areas, so that each beam channel (corresponding to one or more photo-detectors) has up to six adjacent channels that can be monitored in this way.

As represented by block 6-2, the method 600 includes determining whether the adjacent optical communication device is receiving substantial power relative to the power received by the active. In other words, the method 600 includes determining whether the modulated optical signal power received by a second one of the optical communication devices satisfies a criterion relative to the optical signal power received by the first one of the optical communication devices. In some implementations, the criterion includes whether the optical signal power received by the second one of the optical communication devices is greater than the optical signal power received by the first one of the optical communication devices (as shown in FIG. 6 as an example only). Other implementations could use signal to noise ratio, bit error rate or other criteria for this decision. In some implementations, the criterion includes whether the optical signal power received by the second one of the optical communication devices is rising relative to the optical signal power received by the first one of the optical communication devices.

If the adjacent optical communication device is not receiving substantial power relative to the power received by the active device ("No" path from block 6-2), the method circles back to the portion of method represented by block 6-1. If the adjacent optical communication device is receiving substantial power relative to the power received by the active device ("Yes" path from block 6-2), as represented by block 6-3, the method 600 includes adding the second one of the optical communication devices to a transmit multicast group associated with the first active channel. As represented by block 6-4, the method 600 includes transmitting a communication pause instruction on the first active channel. As represented by block 6-5, the method 600 includes determining whether or not an ingress data flow on the first active channel has paused/stopped in response to the transmitted communication pause instruction. If the incoming data flow has not stopped ("No" path from block 6-5), the method circles back to the portion of method represented by block 6-4. If the incoming data flow has not stopped ("Yes" path from block 6-5), as represented by block 6-6, the method 600 includes disconnecting the first optical communication device from the first channel control module by reconfiguring receive cross-bar switch 460, in response to determining that the data flow has paused. As represented by block 6-7, the method 600 includes pairing the second optical communication device with the first channel control module by reconfiguring transmit cross-bar switch 470. As represented by block 6-8, the method 600 includes transmitting a resume communication instruction on the first active channel, which is now supported by the second optical communication device. As represented by block 6-9, the method 600 includes determining whether or not the data flow on the first active channel has resumed in response to the transmitted communication resume instruction. If the incoming data flow has not resumed ("No" path from block 6-9), the method circles back to the portion of method represented by block 6-8. If the incoming data flow resumes ("Yes" path from block 6-9), as represented by block 6-10, the method 600 includes removing the first optical communication device from a multicast group associated with the first active channel. As represented by block 6-11, the method 600 includes updating the active channel database to reflect the pairing between second optical communication device and the first channel control module.

Figure 7:
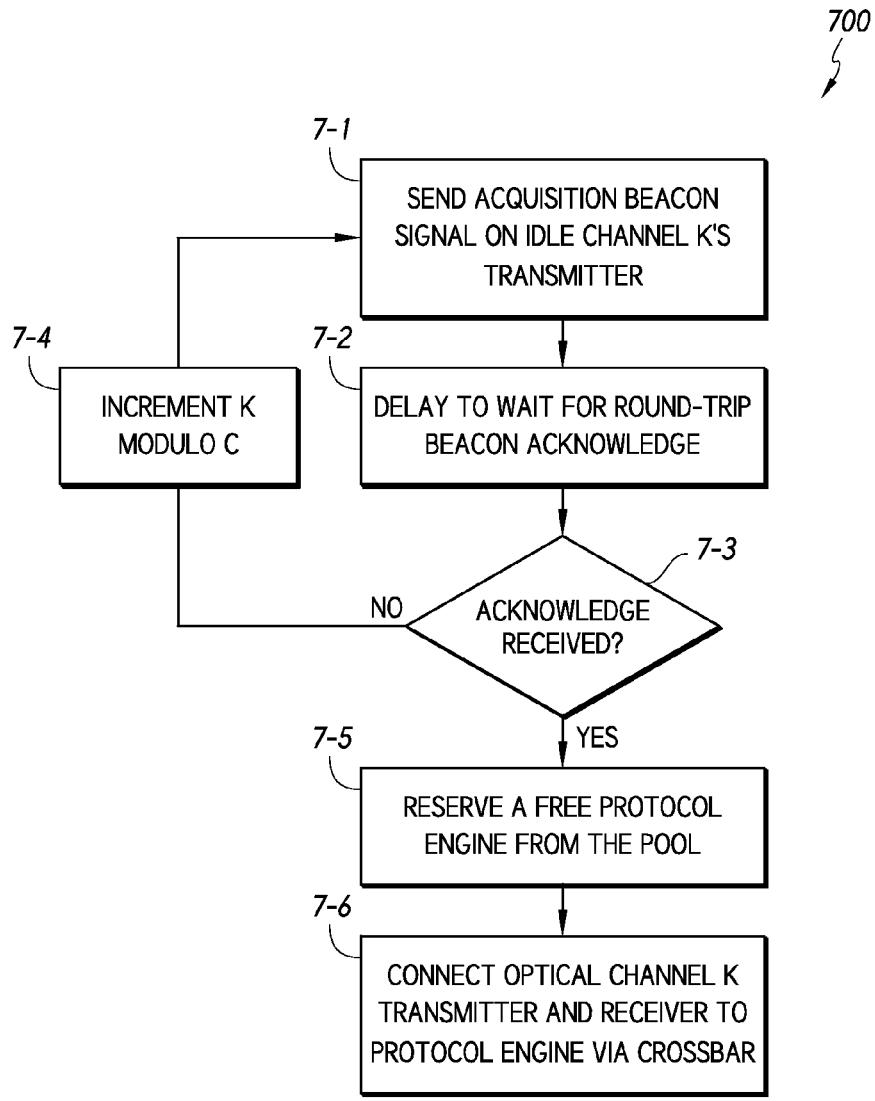
FIG. 7 is a flowchart representation of a method of pairing multi-beam FSO device components in order to support a new data channel according to some implementations.

FIG. 7 is a flowchart representation of a method 700 of pairing multi-beam FSO device components in order to support a new data channel according to some implementations. Briefly, the method 700 includes sequentially selecting an idle optical transmitter in order to transmit an acquisition beacon signal pattern, determining whether a client device has responded with an acknowledgement, and establishing a new pairing between the selected transmitter and a channel control module in response to receiving an acknowledgement.

To that end, as represented by block 7-1, the method 700 includes selecting and transmitting an acquisition beacon signal pattern using a first one of the optical communication devices that are not currently supporting respective active data channels. In other words, the method 700 includes sequentially selecting and operating idle optical transmitters to send an acquisition beacon signal pattern into the angular range of the selected transmitter. For example, with reference to FIG. 4, the method includes selecting the $k^{th}$ idle transmitter 410, and operating the $k^{th}$ idle transmitter 410 to transmit an acquisition beacon signal pattern into the respective portion of the angular range of the multi-beam FSO device 400. As represented by block 7-2, the method 700 includes enforcing a delay of at least an estimated round trip duration in order to wait for a client device to acknowledge the transmission of the acquisition beacon signal pattern. As represented by block 7-3, the method 700 includes determining whether an acknowledgment has been received by a receiver in the device group of the selected transmitter before enforced waiting period has expired. If an acknowledgement has not been received before the end of the waiting period ("No" path from block 7-3, meaning no active far-end transceiver was detected), as represented by block 7-4, the method 700 includes selecting another idle transmitter to transmit an acquisition beacon signal pattern. That is, in some implementations, the $k^{th}+1$ idle transmitter is selected (i.e., k is incremented modulo C). On the other hand, once an acknowledge signal is received ("Yes" path from block 7-3), as represented by block 7-5, the method 700 includes reserving an idle or underutilized channel control module (e.g., a protocol engine in some implementations). For example, with reference to FIG. 4, the link control logic 419 reserves an idle or underutilized protocol engine 450 in order to establish a new link. As represented by block 7-6, the method 700 includes coupling the current $k^{th}$ device group to the reserved channel control module. In other words, the method includes adjusting one or more pairings includes establishing a new pairing between the first one of the optical communication devices and a first one of the channel control modules that are not currently supporting respective active data channels, the new pairing supportive of a new active data channel. For example, with reference to FIG. 4, the link control logic 419 configures the two crossbar switches 460, 470 to connect (i.e., pair) the transmitter/receiver device group to the selected the protocol engine, thus establishing a new link.

Figure 8:
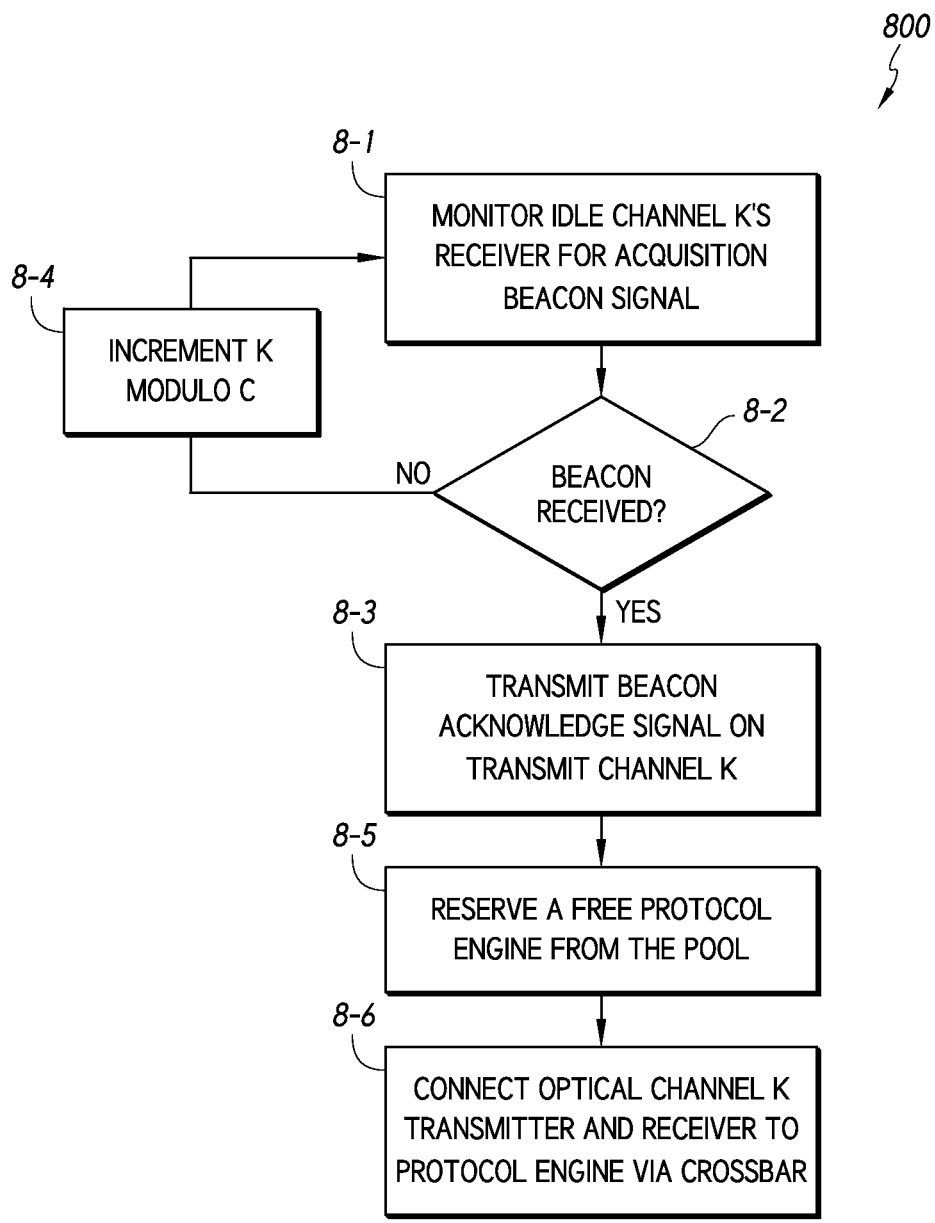
FIG. 8 is a flowchart representation of a method of pairing multi-beam FSO device components in order to support a new data channel according to some implementations.

FIG. 8 is a flowchart representation of a method 800 of pairing multi-beam FSO device components in order to support a new data channel according to some implementations. Briefly, the method 800 includes sequentially selecting an idle optical receiver in order to detect whether the receiver is receiving a link acquisition beacon from a new client device, transmitting an acknowledgment in response to a detection, and establishing a new pairing between the selected receiver and a channel control module. In some implementations, a complete link includes two transceivers, and each endpoint must be able to transmit beacon signals (as described in FIG. 7) and respond appropriately to received beacon signals (as shown in FIG. 8).

To that end, as represented by block 8-1, the method 800 includes selecting and monitoring a first one of the optical communication devices that are not currently supporting respective active data channels. In other words, the method 800 includes sequentially selecting and operating idle optical receivers to identify an incoming optical signal indicative of an acquisition beacon signal pattern within the angular range of the selected receiver. For example, with reference to FIG. 4, the method includes selecting the $k^{th}$ idle receiver 420, and operating the $k^{th}$ idle receiver 420 to observe received optical signal power for an acquisition beacon signal pattern within the respective portion of the angular range of the multi-beam FSO device 400. As represented by block 8-2, the method 800 includes determining whether an acquisition beacon signal pattern has been received by the $k^{th}$ idle receiver 420. If an acquisition beacon signal pattern has not been received by the $k^{th}$ idle receiver 420 ("No" path from block 8-2), as represented by block 8-4, the method 800 includes selecting another idle receiver to monitor. That is, in some implementations, the $k^{th}+1$ idle receiver is selected (i.e., k is incremented modulo C). On the other hand, if an acquisition beacon signal pattern has been received by the $k^{th}$ idle receiver 420 ("Yes" path from block 8-2), as represented by block 8-3, the method 800 includes transmitting an acknowledgement signal using a transmitter in the device group that includes $k^{th}$ idle receiver 420. As represented by block 8-5, the method 800 includes reserving an idle or underutilized channel control module (i.e., protocol engine). For example, with reference to FIG. 4, the link control logic 419 reserves an idle or underutilized protocol engine 450 in order to establish a new link. As represented by block 8-6, the method 800 includes coupling the current $k^{th}$ device group to the reserved channel control module. That is, the method includes adjusting one or more pairings includes establishing a new pairing between the first one of the optical communication devices and a first one of the channel control modules that are not currently supporting respective active data channels, the new pairing supportive of a new active data channel. For example, with reference to FIG. 4, the link control logic 419 configures the two crossbar switches 460, 470 to connect (i.e., pair) the transmitter/receiver device group to the selected the protocol engine, thus establishing a new link.

Additionally, with reference to FIGS. 4, 7 and 8, in some implementations, link acquisition algorithms also determine which assigned channel control modules are no longer processing active channels so that those channel control modules can be returned to the idle and/or underutilized pool and re-provisioned. To that end, each channel control module is periodically polled to determine its level of utilization and/or how long since it last processed a packet. If the channel control module is underutilized for a threshold amount of time, test packets are transmitted to the far-end transceiver. If the test packets are not acknowledged within a timeout window, the link is deactivated and channel control module is idled.

Figure 9:
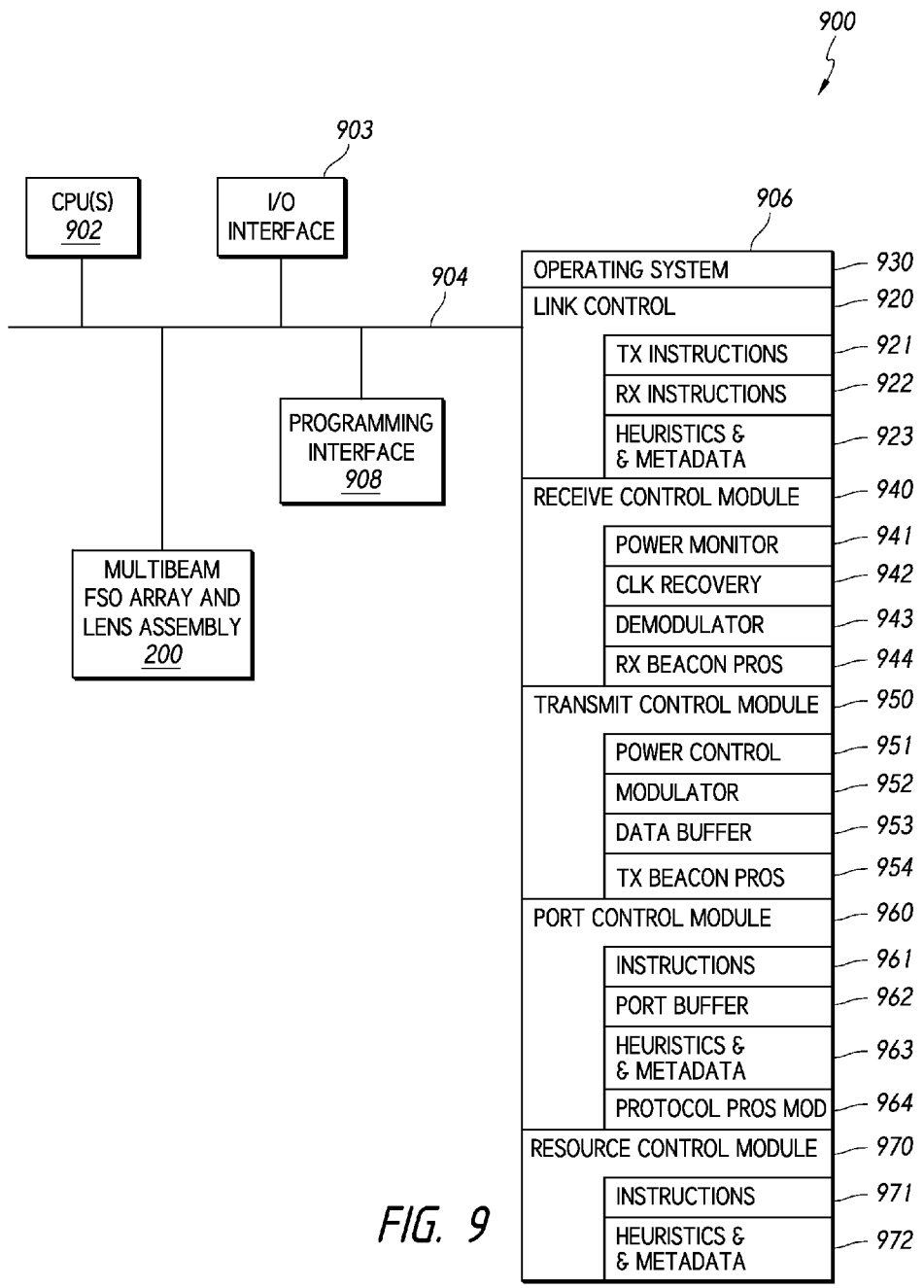
FIG. 9 is a block diagram of a multi-beam FSO system in accordance with some implementations.

FIG. 9 is a block diagram of a multi-beam FSO endpoint system 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations the multi-beam FSO endpoint system 900 includes a multi-beam FSO device 200, one or more processing units (CPU's) 902, one or more input/output (I/O) interfaces 903, a memory 906, a programming interface 908, and one or more communication buses 904 for interconnecting these and various other components.

For the sake of brevity and convenience, the multi-beam FSO device 200 includes the features described above with reference to FIG. 2. However, those of ordinary skill in the art will appreciate that various implementations of a multi-beam FSO device are contemplated.

In some implementations, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some implementations, the memory 906 or the non-transitory computer readable storage medium of the memory 906 stores the following programs, modules and data structures, or a subset thereof including an optional operating system 930, a link control module 920, a receive control module 940, a transmit control module 950, a port control module 960, and a resource control module 970.

The operating system 930 includes procedures for handling various basic system services and for performing hardware dependent tasks.

In some implementations, the link control module 820 is configured to control and/or condition transmission power across multiple optical beam data channels transmitted by the multi-beam FSO device 200; and, control and/or equalize receiver gain across multiple optical beam data channels received by the multi-beam FSO device 200. To that end, in some implementations, the link control module 920 includes a set of transmitter instructions 921, a set of receiver instructions 922, and heuristics and metadata 923. In some implementation, the heuristics and metadata 923 include, for example, a log of previous settings and a lookup table of communication parameters associated with one or more client devices.

In some implementations, the receive control module 940 is configured to recover data from one or more optical beam data channels received by the multi-beam FSO device 200. To that end, in some implementations, the receive control module 940 includes a receiver power monitor 941 (e.g., including data structures), a clock recovery module 942, a demodulator 943, and a receive beacon processing module 944.

In some implementations, the transmit control module 950 is configured to prepare the transmission data for one or more optical beam data channels transmitted by the multi-beam FSO device 200. To that end, in some implementations, the transmit control module 950 includes a transmit power control 951 (e.g., including data structures), a modulator 952, a data buffer 953, and a transmit beacon processing module 954.

In some implementations, the port control module 960 is configured route data streams to and from local ports. To that end, in some implementations, the port control module 960 includes a set of instructions 961, a port buffer 962, heuristics and metadata 963, and a protocol processing module 964. In some implementations, the protocol processing module 964 manages Phy and MAC protocols and protocol functions associated with a FSO link.

In some implementations, the resource control module 970 is configured to monitor optical signal power received by one or more of the optical communication devices in order to detect an incoming optical data signal received using at least one of the optical communication devices; assess a detected incoming optical data signal in order to determine whether or not the incoming optical data signal corresponds to an active data channel; and adjust one or more pairings between the optical communication devices and the channel control modules in response to the assessment of the received optical signal. To that end, in some implementations, the resource control module 970 includes a set of instructions 971, and heuristics and metadata 972. In some implementations, resource control module 970 is configured to manage pools of free resources, and reports any errors or resource exhaustions.

In some implementations, a device and/or a circuit having one or more features described herein can be included in any number of communication devices. Such a device and/or a circuit can be implemented directly in the communication device, in a modular form as described herein, or in some combination thereof. In some embodiments, such a communication device can include, for example, a cellular phone, a smart-phone, a hand-held wireless device with or without phone functionality, a tablet, a router, an access point, a base station, a server, vehicles, instruments, sensors, actuators, etc. That is, those skilled in the art will also appreciate from the present disclosure that in various implementations the multi-beam FSO apparatus is included in various devices, such as a computer, a laptop computer, a tablet device, a netbook, an internet kiosk, a personal digital assistant, an optical modem, an access point, a base station, a repeater, a wireless router, a mobile phone, a smartphone, a gaming device, a computer server, or any other computing device. In various implementations, such devices include one or more processors, one or more types of memory, a display and/or other user interface components such as a keyboard, a touch screen display, a mouse, a track-pad, a digital camera and/or any number of supplemental devices to add functionality.

A number of other device configurations can utilize one or more features described herein. For example, a device does not need to be a multi-band device. In another example, a device can include one or more multi-beam FSO apparatuses, and additional connectivity features such as Wi-Fi, Bluetooth, and GPS.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a multi-beam free-space optical device including optical communication devices, a lens assembly and channel control modules, wherein an active data channel is supported by a respective pairing of an optical communication device and a channel control module, wherein a first set of the optical communication devices is provided on a first substrate, and a second set of the optical communication devices is provided on a second substrate that is parallel to the first substrate, wherein the first substrate includes perforations that permit light beams to pass to and from the second set of optical communication devices on the second substrate, wherein the lens assembly includes a surface shaped to direct ingress light received substantially within a first angular range towards the optical communication devices, and to direct egress light away from the optical communication devices into the first angular range;
    monitoring optical signal power received by one or more of the optical communication devices in order to detect an incoming optical data signal received using at least one of the optical communication devices;
    assessing a detected incoming optical data signal in order to determine whether or not the incoming optical data signal corresponds to an active data channel; and
    adjusting one or more pairings between the optical communication devices and the channel control modules in response to the assessment of the received optical signal.

2. The method of claim 1, wherein monitoring optical signal power received by one or more of the optical communication devices comprises:
    monitoring optical signal power received by a first one of the optical communication devices primarily supporting a first active data channel in combination with a first one of the channel control modules; and
    monitoring optical signal power received by a second one of the optical communication devices, the second one of the optical communication devices being proximate to the first one of the optical communication devices.

3. The method of claim 2, wherein the second one of the optical communication devices is adjacent to the first one of the optical communication devices.

4. The method of claim 2, wherein the second one of the optical communication devices is not primarily supporting the first active data channel while the first one of the optical communication devices is primarily supporting the first active data channel.

5. The method of claim 1, wherein a first active data channel is primarily supported by a first one of the optical communication devices in combination with a first one of the channel control modules, and assessing further comprises:
    determining whether the optical signal power received by a second one of the optical communication devices satisfies a criterion relative to the optical signal power received by the first one of the optical communication devices.

6. The method of claim 5, wherein the criterion includes at least one of:
    whether the optical signal power received by the second one of the optical communication devices is greater than the optical signal power received by the first one of the optical communication devices;
    whether a bit error rate of the optical signal received by the second one of the optical communication devices is less than a bit error rate of the optical signal received by the first one of the optical communication devices; and
    whether the optical signal power received by the second one of the optical communication devices is rising relative to the optical signal power received by the first one of the optical communication devices.

7. The method of claim 1, wherein a first active data channel is primarily supported by a first one of the optical communication devices in combination with a first one of the channel control modules, and adjusting one or more pairings further comprises:
    transferring primary support of the first active data channel to a combination of a second one of the optical communication devices and the first one of the channel control modules, in response to a change in the received optical signal power.

8. The method of claim 7, wherein transferring primary support of the first active data channel comprises adding the second one of the optical communication devices to a multicast group associated with the first active channel.

9. The method of claim 7, wherein transferring primary support of the first active data channel comprises:
    transmitting a communication pause instruction on the first active channel;
    determining whether or not an ingress data flow on the first active channel has paused; and
    disconnecting the first optical communication device from the first channel control module, in response to determining that the data flow has paused.

10. The method of claim 9 further comprising:
    pairing the second optical communication device with the first channel control module;
    transmitting a resume communication instruction on the first active channel;
    determining whether the data flow has resumed using the second optical communication device; and
    removing the first optical communication device from a multicast group associated with the first active channel and returning it to a free pool for reuse.

11. The method of claim 1, further comprising:
    transmitting an acquisition beacon signal using a first one of the optical communication devices that are not currently supporting respective active data channels; and determining whether or not an acknowledgment is received in response to the transmission of the acquisition beacon signal, wherein adjusting one or more pairings includes establishing a new pairing between the first one of the optical communication devices and a first one of the channel control modules that are not currently supporting respective active data channels, the new pairing supportive of a new active data channel.

12. The method of claim 11, wherein establishing the new pairing includes coupling the first one of the optical communication devices and the first one of the channel control modules through a cross-bar switch.

13. The method of claim 11, wherein monitoring optical signal power comprises monitoring optical signal power received by the first one of the optical communication devices for a limited duration, after which it is deemed that a valid acknowledgement will not be received in response to the transmission of the acquisition beacon signal.

14. The method of claim 1, wherein:
monitoring optical signal power comprises monitoring a first one of the optical communication devices that are not currently supporting respective active data channels, assessing a detected incoming signal in order to determine whether or not an acquisition beacon signal is being received by the first one of the optical communication devices, and adjusting one or more pairings includes establishing a new pairing between the first one of the optical communication devices and a first one of the channel control modules that are not currently supporting respective active data channels.

15. The method of claim 14 further comprising transmitting an acknowledgment using the first one of the optical communication devices.

16. The method of claim 14, wherein establishing the new pairing includes coupling the first one of the optical communication devices and the first one of the channel control modules through a cross-bar switch.

17. An apparatus comprising:
a plurality of free-space optical communication devices;
a lens assembly including a surface shaped to direct ingress light received substantially within a first angular range towards the optical communication devices, and to direct egress light away from the optical communication devices into the first angular range;
a plurality of channel control modules, wherein an active data channel is supported by a respective pairing between one of the plurality of free-space optical communication devices and one of the plurality channel control modules, wherein a first set of the optical communication devices is provided on a first substrate, and a second set of the optical communication devices is provided on a second substrate that is parallel to the first substrate, wherein the first substrate includes perforations that permit light beams to pass to and from the second set of optical communication devices on the second substrate;

at least one cross-bar switch configured to selectively couple at least one of the plurality of free-space optical communication devices to at least one of the plurality channel control modules; and
control logic configured to adjust one or more pairings between the plurality of optical communication devices and the plurality of channel control modules in response to an assessment of an optical signal receiving by one of the plurality of optical communication devices.

18. A multi-beam free-space optical device comprising:
a plurality of free-space optical communication devices, wherein a first set of the optical communication devices is provided on a first substrate, and a second set of the optical communication devices is provided on a second substrate that is parallel to the first substrate, wherein the first substrate includes perforations that permit light beams to pass to and from the second set of optical communication devices on the second substrate;
a lens assembly including a surface shaped to direct ingress light received substantially within a first angular range towards the optical communication devices, and to direct egress light away from the optical communication devices into the first angular range;
a plurality of channel control modules, wherein an active data channel is supported by a respective pairing between one of the plurality of free-space optical communication devices and one of the plurality channel control modules;
a processor;
a non-transitory memory including instructions, that when executed by the processor cause the multi-beam free-space optical device to:
monitor optical signal power received by one or more of the optical communication devices in order to detect an incoming optical data signal received using at least one of the optical communication devices;
assess a detected incoming optical data signal in order to determine whether or not the incoming optical data signal corresponds to an active data channel; and
adjust one or more pairings between the optical communication devices and the channel control modules in response to the assessment of the received optical signal.

19. The multi-beam free-space optical device of claim 18, wherein at least some of the channel control modules are configured to manage and provide an external interface for the plurality of optical communication link endpoints.

20. The multi-beam free-space optical device of claim 18, wherein at least some of the channel control modules are configured to provide at least one of protocol processing, modulation, demodulation, data buffering, power control, routing, switching, clock recovery, amplification, decoding, and error control.

* * * * *